United States Patent [19]

Evans et al.

[11] Patent Number: 5,843,354
[45] Date of Patent: Dec. 1, 1998

[54] METHOD FOR COMPRESSION MOLDING A FAN BLADE

[75] Inventors: Charles R. Evans, Cincinnati; Jackie D. Jones, Fairfield, both of Ohio; James M. Campbell, Burlington, Ky.

[73] Assignee: General Electric Company, Cincinnati, Ohio

[21] Appl. No.: 972,689

[22] Filed: Nov. 18, 1997

Related U.S. Application Data

[63] Continuation of Ser. No. 560,254, Nov. 21, 1995, abandoned.

[51] Int. Cl.$^6$ .............................. B27N 3/12; B32B 31/10; B63H 1/76
[52] U.S. Cl. ..................... 264/136; 264/250; 264/137; 264/254; 264/322; 264/271.1; 264/257; 264/258; 264/276; 416/241 A; 156/344; 156/289; 156/247
[58] Field of Search .................................. 264/258, 257, 264/250, 276, 271.1, 322, 136, 137, 254; 156/344, 289, 247

[56] References Cited

U.S. PATENT DOCUMENTS

| | | | |
|---|---|---|---|
| 1,138,250 | 5/1915 | Savage | 264/316 |
| 1,424,386 | 8/1922 | Stoner | 264/316 |
| 1,457,986 | 6/1923 | Marquette | 264/316 |
| 1,649,358 | 11/1927 | Maynard | 264/316 |
| 2,202,014 | 5/1940 | Lougheed | 264/258 |
| 2,439,716 | 4/1948 | Canfield et al. | 264/258 |
| 2,485,827 | 10/1949 | Hartzell | 264/258 |
| 2,589,786 | 3/1952 | Engel et al. | 416/241 A |
| 2,952,040 | 9/1960 | Phillips | 264/258 |
| 3,041,660 | 7/1962 | Fink | 264/316 |
| 3,886,647 | 6/1975 | Alexander | 416/214 A |
| 3,902,944 | 9/1975 | Ashton et al. | 416/241 A |
| 4,222,808 | 9/1980 | Hale et al. | 156/245 |
| 4,244,765 | 1/1981 | Tokuno | 156/180 |
| 4,379,013 | 4/1983 | Tambussi | 264/257 |
| 4,720,244 | 1/1988 | Kluppel et al. | 416/241 A |
| 4,737,208 | 4/1988 | Bloechle et al. | 156/90 |
| 4,755,343 | 7/1988 | Kromrey | 254/570 |
| 5,106,568 | 4/1992 | Honka | 264/510 |
| 5,248,242 | 9/1993 | Lallo et al. | 264/258 |
| 5,384,085 | 1/1995 | Houser et al. | 264/313 |

*Primary Examiner*—Jan H. Silbaugh
*Assistant Examiner*—Robin S. Gray
*Attorney, Agent, or Firm*—Andrew C. Hess; David L. Narciso

[57] ABSTRACT

A method for compression molding a resin-impregnated preform to fabricate an impact-resistance, fiber-reinforced composite fan blade for use in a high bypass turbofan engine. The method is compatible with the use of high viscosity resin systems that contribute greater impact resistance to the fan blade, but whose flow through the fan blade during molding would cause unacceptable movement of the reinforcing fibers. The method entails restricting the flow of the resin system within the preform through selective placement of a resin-impervious material on certain surfaces of the preform, so as to prevent resin loss and fiber movement during the compression molding operation.

20 Claims, 3 Drawing Sheets

METHOD FOR COMPRESSION MOLDING A FAN BLADE

This application is a Continuation of application Ser. No. 08/560,254 filed Nov. 21, 1995 now abandoned.

The present invention relates to a method for compression molding a fan blade of a type used in high bypass turbofan engines. More particularly, this invention relates to a method for compression molding a composite fan blade from a resin-impregnated preform, in which resin flow within the preform is intentionally inhibited so as to prevent fiber movement during molding and thereby promote the structural integrity of the composite fan blade.

BACKGROUND OF THE INVENTION

High bypass turbofan engines are widely used for high performance aircraft that operate at subsonic speeds. Large fans are typically placed at the front of such engines, and serve to produce greater thrust and reduce specific fuel consumption. To minimize engine weight while optimizing performance, it is often preferred to incorporate a maximum number of fan blades having a fixed root blade configuration (i.e., the blade is dovetailed into a hub). As is known, for a given air flow requirement, weight reduction occurs if a greater number of thinner blades are used as opposed to a fewer number of thicker blades. Further weight reduction can be achieved in high bypass engines with the use of composite fan blades formed from such materials as graphite fiber-reinforced epoxies. However, composite blades are brittle in comparison to other blade alloy materials, such as titanium-base alloys, and have therefore typically necessitated thicker blades to withstand impacts from foreign objects. As a result, weight reduction is generally limited by the minimum allowed thickness for blades formed from composite materials.

Accordingly, much effort has been directed to fan blades formed from lightweight., higher strength composite materials that are more resistant to foreign object impact. Molding methods for the fabrication of composite blades have also been of primary interest in order to produce flaw-free, high strength blades. In the prior art, molding techniques for the production of fan blades have primarily relied on autoclave operations to consolidate, debulk and cure several layers of resin pre-impregnated (prepreg) material, collectively termed a preform. Autoclave processing typically does not necessitate resin loss, and therefore can lead to part variability.

In contrast, compression molding techniques promote repeatable dimensional accuracy by squeezing out excess resin from within a preform. Accordingly, compression molding is highly suitable for fabricating composite components where dimensional accuracy and repeatability cannot be adequately achieved by autoclaving. Typically, compression molding entails placing the preform in a mold cavity having the desired shape for the end product. The mold is then closed, and the preform is heated under pressure within the mold in order to consolidate the preform and cure the resin. While under pressure, the resin flows to be appropriately redistributed within and between the plies of material in order to promote adhesion of the plies upon curing. Because the precise amount of resin necessary for the preform is difficult to control in manufacture and to ascertain for typical manufacturing conditions, and because insufficient resin within the plies would yield a structurally unsatisfactory product, prepregs used in compression molding processes are impregnated with excess resin that must readily flow out of the preform during molding, as taught by U.S. Pat. No. 4,222,808 to Hale et al. and U.S. Pat. No. 5,106,568 to Honka. Resin flow is generally assured by the use of resins having a sufficiently low viscosity (e.g., about one to two poise or less) at typical molding temperatures (e.g., about 120° C. to about 180° C.).

For compression molded fan blades of gas turbine engines, the ability to withstand impact by a foreign object is a challenging structural requirement. As would be expected, the resin system employed must be carefully chosen and formulated to achieve the required resistance to foreign body impact damage (FOD). Simultaneously, resin system formulations must also be compatible with compression molding techniques, which has included the ability of the resin to adequately flow through the preform during molding without causing fiber movement within the plies, which would otherwise degrade the mechanical properties of the fan blade.

Because higher strengths and low resin viscosity at acceptable compression molding temperatures are often conflicting requirements, fan blades for high bypass gas turbofan engines have often been produced by autoclave processes. However, because compression molding techniques are generally capable of greater dimensional accuracy and repeatability, it would be advantageous if a method were available that enabled the use of a compression molding process to yield fiber-reinforced fan blades that exhibit enhanced impact resistance.

SUMMARY OF THE INVENTION

It is an object of this invention to provide a compression molding method for producing an impact-resistant, fiber-reinforced fan blade for a high bypass turbofan engine.

It is a further object of this invention that such a method enables the use of a high viscosity, modified resin system that promotes the impact-resistance of the fan blade.

It is yet another object of this invention that such a method prevents movement of fibers within the resin-impregnated plies caused by flow of the high viscosity resin system.

In accordance with a preferred embodiment of this invention, these and other objects and advantages are accomplished as follows.

According to the present invention, there is provided a method for compression molding several layers of resin pre-impregnated material to form an impact-resistant, fiber-reinforced composite fan blade for use in a high bypass turbofan engine. In particular, the method is compatible with the use of thermoplastically-modified high viscosity resin systems that contribute greater impact resistance to the fan blade, but whose flow through the fan blade during molding would cause unacceptable movement of the reinforcing fibers. As used herein, the term "modified" denotes that the basic resin system, which is inherently brittle, has been formulated to include thermoplastic and/or rubber materials to enhance matrix toughness. The method entails preventing flow of the resin system within the prepregs through selective placement of a resin-impervious material on certain surfaces of the prepregs, so as to prevent fiber movement and resin loss during the compression molding operation.

The method of this invention generally entails forming a resin-impregnated, fiber-reinforced blade preform having a blade tip region and an oppositely disposed blade root region. As is typical, the blade root region includes a root face, a suction face and an oppositely disposed pressure face, and a forward face and an oppositely-disposed aft face. According to this invention, the resin used to impregnate the prepregs contributes enhanced impact resistance to the resulting fan blade. Generally, such resins include epoxies combined with thermoplastic and/or rubber materials as toughening agents, yielding a viscosity of about twenty poise or more at a compression molding temperature of about 180° C.

After the preform has been formed, a limited portion of the blade preform is then selectively masked with a resin-impermeable material. In particular, the limited portion includes at least portions of the root face, forward face, aft face, suction face, pressure face, and edges of the blade root region between the root face, forward face, aft face, suction face and pressure face. Notably, the blade airfoil region is not masked with the resin-impermeable material. The blade preform is then compression molded so as to form the fiber-reinforced composite fan blade at a suitable temperature and pressure.

According to this invention, the selective placement of the resin-impermeable material is surprisingly capable of restraining flow of the resin within the root region of the preform during the compression molding step, such that the resin remains within the blade preform and such that fiber movement in the blade root region during the compression molding step is prevented. After the molding operation, the resin-impermeable material is stripped from the fiber-reinforced composite fan blade.

From the above, it can be seen that a significant advantage of the present invention is that a composite fan blade exhibiting enhanced impact resistance can be produced by compression molding, so as to achieve greater dimensional accuracy and reliability attributable to the process capabilities of the compression molding operation. Enhanced impact resistance is achieved through the use of a modified resin system having a high viscosity that is generally incompatible with prior art compression molding methods. According to the invention, compatibility is achieved by preventing flow of the resin during molding, so as to prevent fiber movement that would otherwise lead to degradation of the mechanical properties of a fan blade.

Other objects and advantages of this invention will be better appreciated from the following detailed description.

DETAILED DESCRIPTION OF THE INVENTION

Figure 1:
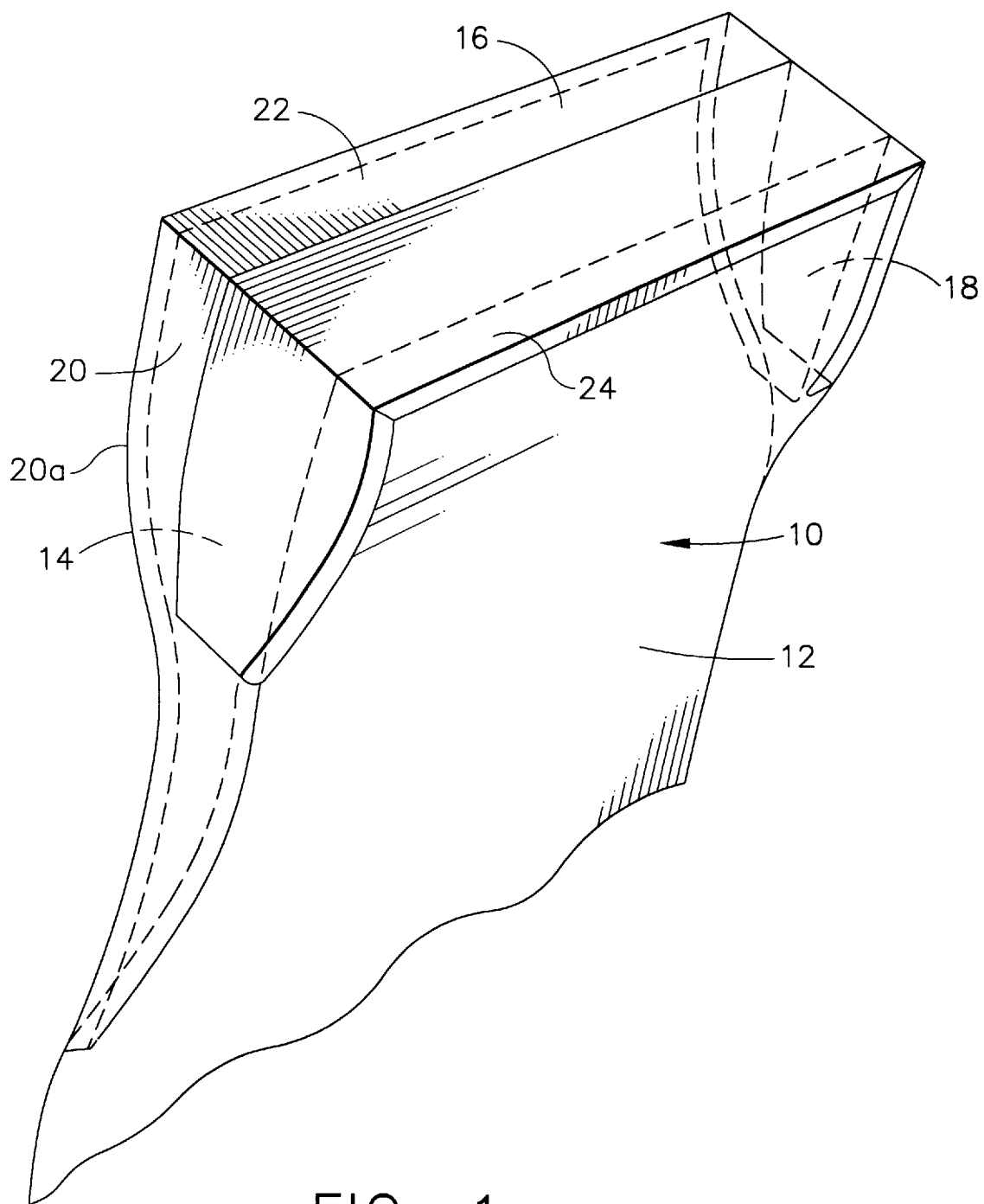
FIGS. 1 through 4 represent four steps entailed in preparing a fan blade preform for a compression molding process, in which the region of the preform corresponding to the root of the blade is masked with a resin-impermeable tape in accordance with a preferred embodiment of this invention.

The present invention provides a method for compression molding a fiber-reinforced composite fan blade for a high bypass turbofan engine, wherein the modified resin system forming the matrix of the composite fan blade is characterized by high viscosity prior to curing, and high impact resistance after curing. FIGS. 1 through 4 represent the blade root region 10 of a blade preform which, after compression molding, will form a fan blade of a type adapted for use in a high bypass turbofan engine. Though certain dimensional and shape characteristics are indicated by the blade preform represented in the Figures, those skilled in the art will appreciate that the teachings of this invention will also be applicable to a wide variety of compression-moldable composite articles.

For compression molded fan blades of the type represented, a pivotal structural requirement is the ability to withstand impact by a foreign object. Accordingly, the resin system employed to form the matrix of the fan blade preform of this invention is formulated to achieve enhanced impact resistance in conjunction with a reinforcement filler such as carbon fibers. More particularly, the resin system for the composite fan blades of this invention includes modifiers, such as thermoplastic resins and rubber materials, resulting in a highly viscous resin system that does not readily flow at temperatures typical of compression molding processes, yet yields a composite structure having enhanced mechanical properties for greater impact resistance. A preferred resin system is a resin based on an epoxy modified with thermoplastic and/or rubbers as toughening agents. The suitable prepreg system is composed of about thirty weight percent epoxy resin, about five weight percent toughening agent, with the balance being fiber, resulting in a resin system having a viscosity of at least about twenty poise, and as high as thirty poise or more, at a temperature of about 180° C.

The preferred resin system described above would not be compatible for use in prior art compression molded composite fan blades, in that resin flow would be suppressed to the extent that excess resin could not be removed from the blade preform when compressed, resulting in a fan blade exhibiting unacceptable mechanical properties. Furthermore, the limited flow permitted with such a viscous resin system would cause undesirable movement of the fibers within the preform, thereby further degrading the mechanical properties of the fan blade.

According to the present invention, the aforementioned shortcomings are all overcome by restricting the resin flow through (and from) the blade preform, so as to eliminate the occurrence of fiber movement in the preform during compression molding. FIGS. 1 through 4 represent a preferred method for preventing resin loss in a manner that avoids the necessity of masking the entire fan blade, yet still achieves the desired result. Specifically, the Figures illustrate the blade root region 10 of a fan blade preform that will subsequently be compression molded to form a fiber-reinforced composite fan blade of a high bypass turbofan engine. The preform is generally composed of one or more layers of resin-impregnated, carbon fiber-reinforced plies which, aside from the viscous resin system used in accordance with this invention, can be conventional in the art. The blade preform includes the blade root region 10 and an oppositely-disposed blade tip region (not shown). As used herein, the blade root region 10 is defined and shown to include the dovetailed root seen in the Figures and a portion of the fan blade immediately adjacent the root. In accordance with terminology generally employed with fan blades, the blade root region 10 includes a suction face 12, an oppositely disposed pressure face 14, a root face 16, a forward face 18 and an oppositely-disposed aft face 20. The blade root region 10 has the dovetail shape of a fixed root blade for attachment to a hub (not shown). With the blade design represented, the aft face 20 has a significantly longer longitudinal length than does the forward face 18. Both the forward and aft faces 18 and 20 lie entirely within the region defined here as the blade root region 10.

As previously indicated, the blade preform may be formed by stacking, or "laying up," several layers of fiber material impregnated with the resin system previously described, or a modified resin system having properties similar to the resin system described. A preferred reinforcement fiber is carbon, though other fiber materials could foreseeably be used. The resin and fiber content of the preform are closely controlled in ensure that a precise amount of material fills the mold cavity. In practice, preform content can be accurately accomplished by controlling the weight of the preform during the layup process to attain a final required target weight for the preform.

According to the invention, a limited portion of the blade root region 10 is selectively masked with a resin-impermeable tape, the process of which is depicted in FIGS. 1 through 4. As will become apparent, the masked portions of the blade root region 10 include at least portions of the suction face 12, pressure face 14, root face 16, forward face 18 and aft face 20, as well as the edges formed between the aforementioned faces. Notably, masking is limited to the blade root region 10, and need not extend to the blade tip region of the preform. While various resin-impermeable materials could be used, a preferred material is tetrafluoroethylene fluorocarbon available under the trademark "TEFLON" from Du Pont de Nemours, E. I. & Company. A suitable form for this material, when masking the blade root region 10, is a tape having a thickness of about 0.003 inch (about 0.075 millimeter) of a type commercially available from 3M of St. Paul, Minn.

FIG. 1 represents a first masking operation of the invention, in which the root face 16, forward face 18 and aft face 20 of the blade root region 10 are masked with two overlapping strips 22 and 24 of tape, with each strip 22 and 24 preferably having a width of about 7.5 centimeters (about three inches). As indicated, the strip 22 is first applied over the root, forward and aft faces 16, 18 and 20 and over the edges that each of these faces forms with the pressure face 14, and the strip 24 is then applied over the root, forward and aft faces 16, 18 and 20 and the edges that each of these faces forms with the suction face 12. The strips 22 and 24 preferably extend about six to nine millimeters (about one-quarter to about three-eighths inch) beyond each of their respective edges. As shown, the root, forward and aft faces 16, 18 and 20 of the blade root region 10 are preferably masked in their entirety, in that there is a greater tendency for resin flow beneath and through these surfaces as a result of the complex geometry and abrupt thickness changes present here.

Figure 2:
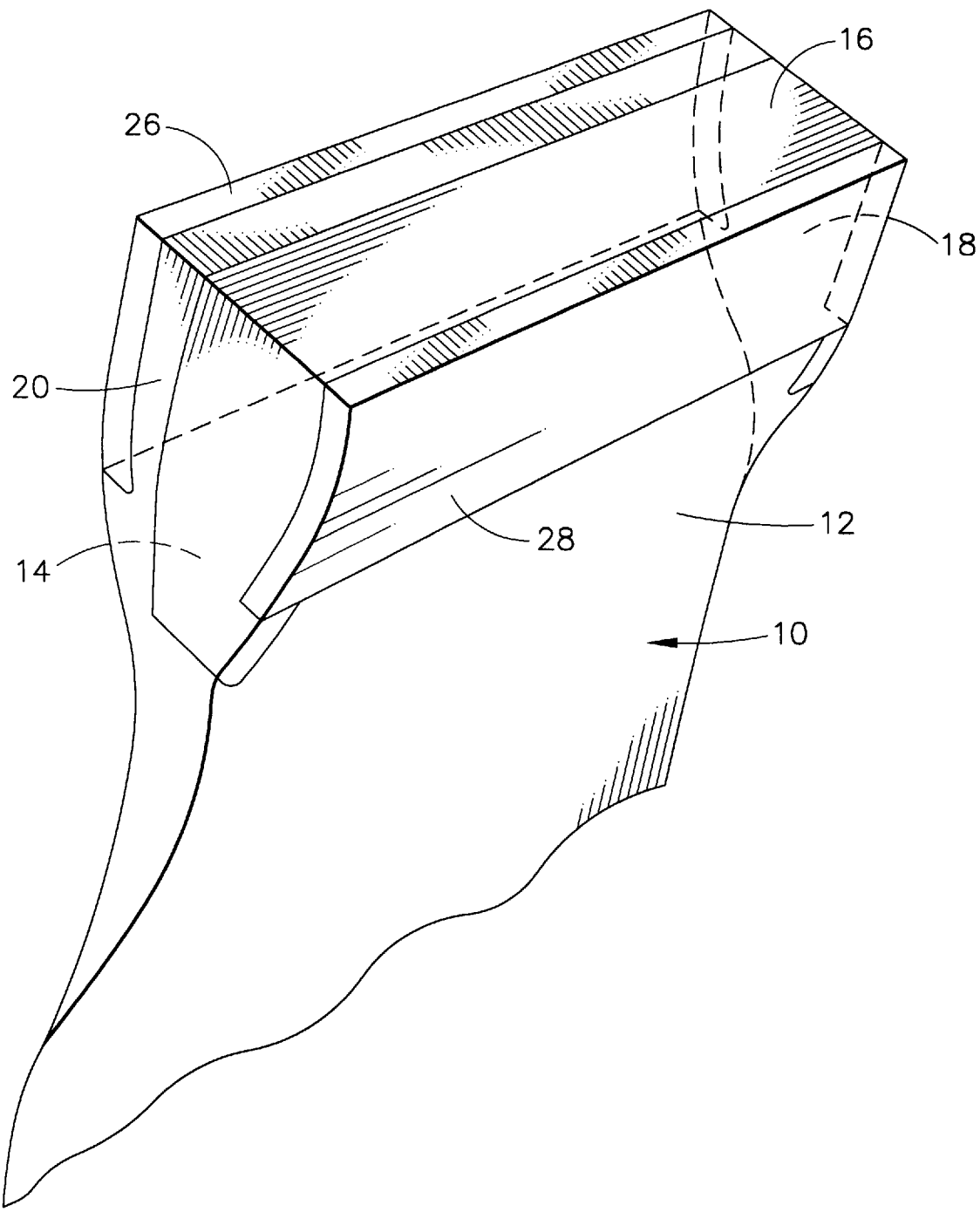

A second masking operation of the invention is represented in FIG. 2, in which the suction and pressure faces 12 and 14 of the blade root region 10 are masked with separate strips of tape, each of which again has a width of about 7.5 centimeters (about three inches). As indicated, one strip 26 of tape is applied over the surface of the pressure face 14 adjacent the root face 16, as well as the adjoining edges that the pressure face 14 forms with the root, forward and aft faces 16, 18 and 20. Similarly, a strip 28 of tape is applied over the surface of the suction face 12 adjacent the root face 16, as well as the adjoining edges that the suction face 12 forms with the root, forward and aft faces 16, 18 and 20. In contrast to the strips 22 and 24 applied previously, the strips 26 and 28 preferably extend about twelve to thirteen millimeters (about one-half inch) beyond each of their respective edges. Also in contrast to the step portrayed in FIG. 1, it was surprisingly determined that the suction and pressure faces 12 and 14 need not be masked in their entirety within the blade root region 10, but only to the extent shown in FIG. 2 (e.g., about six to seven centimeters as measured in a longitudinal direction from their respective edges formed with the root face 16). Notably, those portions of the edges masked during this step are now covered by two layers of tape, as a result of these same edges being masked during the masking step represented in FIG. 1.

Figure 3:
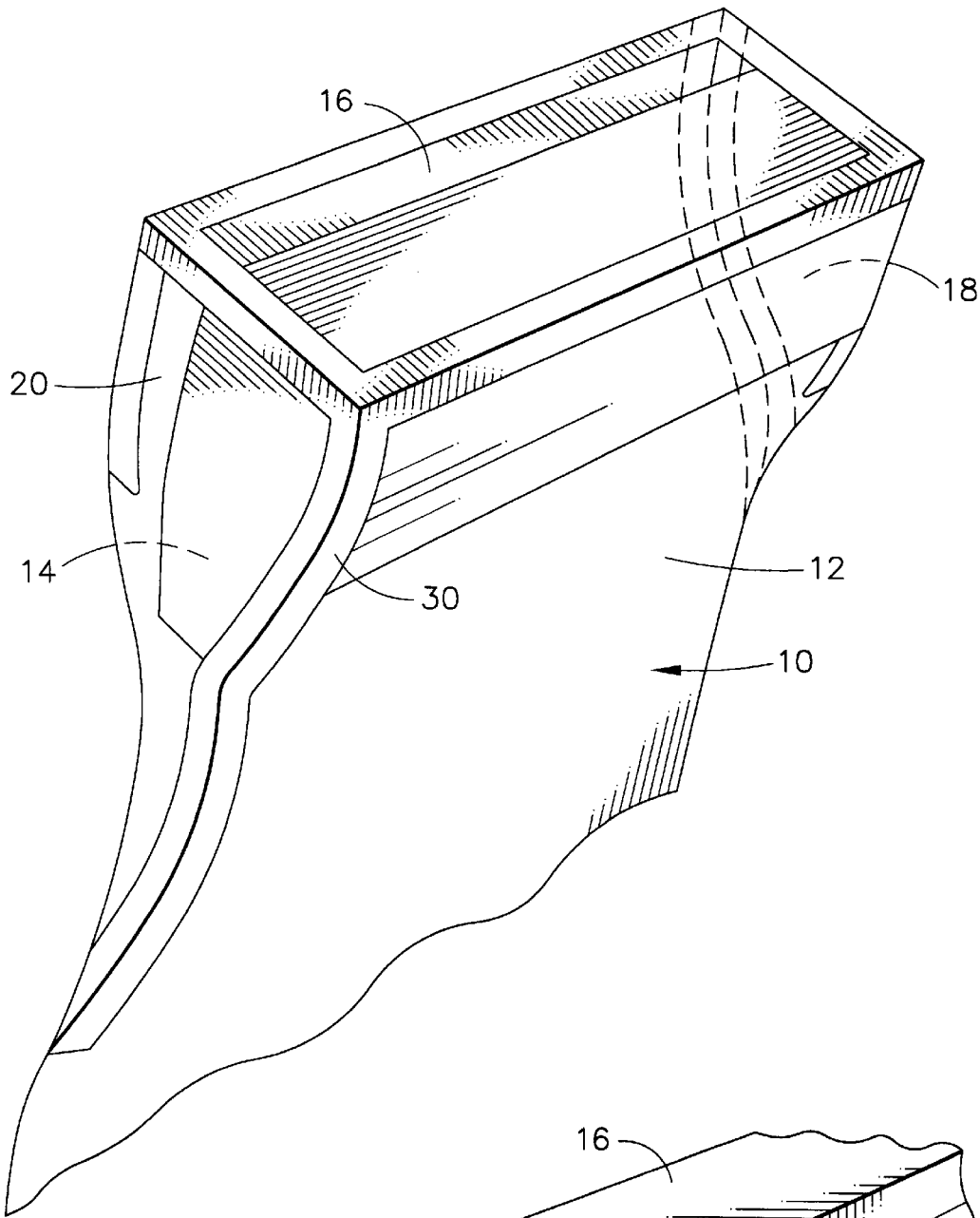

FIG. 3 illustrates a third masking operation, in which each of the edges formed by the root face 16 are masked with tape segments 30, as well as the edge formed by the suction and aft faces 12 and 20, and the edge formed by the pressure and forward faces 14 and 18. A suitable width for each of the tape segments 30 used here is about 2.5 centimeters (about one inch). As indicated, the entire lengths of the edges formed between the suction and aft faces 12 and 20 and the pressure and forward faces 14 and 18 are preferably masked. At this time, those portions of the edges masked by the second masking step (FIG. 2) are now masked by three layers of tape, while the remaining portions of the edges masked during this third masking step (FIG. 3) are now masked by two layers of tape and the remaining portions of the edges masked during the first masking step (FIG. 1) remain masked by a single layer of tape.

Figure 4:
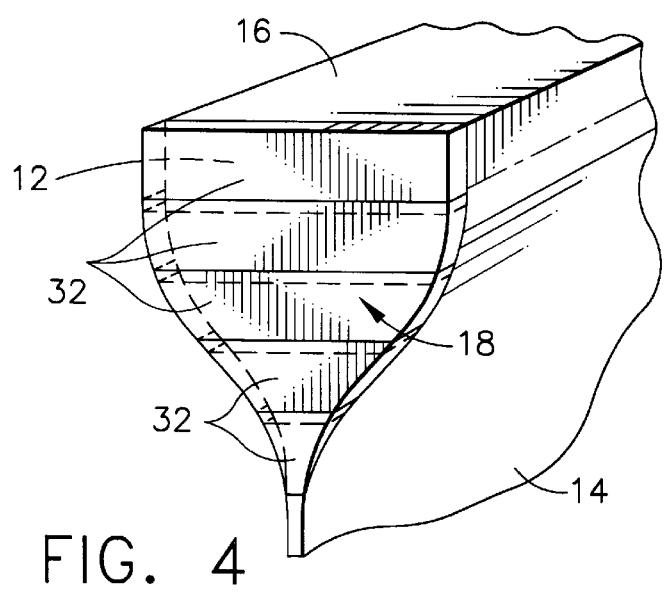

A fourth and final masking operation of this invention is represented in FIG. 4, in which the forward face 18 of the blade root region 10 is masked with overlapping strips 32 of tape, again having widths of about 2.5 centimeters (about one inch). As indicated, the strips 32 of tape are applied over the entire surface of the forward face 18, as well as the adjoining edges that the forward face 18 forms with the suction, pressure and root faces 12, 14 and 16. An overlap between adjacent strips 32 of about three millimeters (about one-eighth inch) is preferred. In addition, the strips 32 of tape extend around the adjoining edges by about twelve to thirteen millimeters (about 0.5 inch).

At the completion of this fourth and final masking step, the majority of the forward face 18 is masked by two layers of tape, with three and four layers of tape being present where overlaps occurred as a result of the first (FIG. 1) and fourth (FIG. 4) masking steps. Furthermore, the edge formed between the suction and forward faces 12 and 18 is now masked by two or three layers of tape, while the edge formed between the pressure and forward faces 14 and 20 is now masked by three or four layers of tape.

From the above, it is apparent that significant emphasis is directed to masking the edges of the faces forming the blade root region 10 of the blade preform. Specifically, all edges formed by the root, forward and aft faces 16, 18 and 20 with the suction and pressure faces 12 and 14 are covered with at least one layer of tape. Furthermore, the majority of the edges formed by the root, forward and aft faces 16, 18 and 20 with the suction face 12 are covered with three layers of tape, the entire edge formed by the root and pressure faces 16 and 14 is covered with three layers of tape, and a portion of the edge formed by the pressure and forward faces 14 and 18 is covered with four layers of tape. Such a technique is in response to the observation of resin loss at the split line of the compression mold corresponding to the root, forward and aft faces 16, 18 and 20 of the blade preform. While some degree of resin loss would be expected and intended with prior art compression molding techniques using lower viscosity resins, the present invention seeks to prevent resin flow and severely restrict resin loss in the blade root region 10 of the preform in order to prevent fiber movement as a result of the highly viscous resin system employed. The strips 22–32 of tape prevent rupture at the critical locations of the preform during consolidation, thus preventing escape of the resin from the mold. Surprisingly, though only limited portions of the blade root region 10 are masked, prevention of resin flow in the masked regions is sufficient to reduce resin loss to as little as 0.5 weight percent and less, and suppress a dynamic flow situation in the preform, which would otherwise cause fiber movement during the compression molding operation resulting in fiber misalignment and wrinkles (i.e., an out-of-plane fiber displacement).

Following the masking steps portrayed in FIGS. 1 through 4, the blade preform is compression molded in a metal die so as to form a fiber-reinforced composite fan blade. As is conventional, a suitable temperature and pressure for this operation are generally about 180° C. and about 300 psig. Preferred parameters for compression molding operations of the type intended here are well within the capability of one skilled in the art, and will not be discussed in any greater detail. After the molding operation, the tape strips 22–32 can be readily removed from the fiber-reinforced composite fan blade. Because resin loss is essentially prevented, the prior art requirement to remove resin flash from the fan blade root region is eliminated.

From the above, it can be seen that a significant advantage of the present invention is that a composite fan blade exhibiting enhanced impact resistance can be produced by compression molding, so as to achieve greater dimensional accuracy and reliability attributable to the process capabilities of the compression molding operation. Furthermore, enhanced impact resistance is achieved through the use of a resin system having a high viscosity that is generally incompatible with prior art compression molding methods. To overcome this incompatibility, the present invention teaches a modified compression molding technique by which resin flow and loss during molding is prevented, in contrast to conventional compression molding methods in which resin flow and loss is encouraged through the intentional use of resins having relatively low viscosities of about one poise or less at typical molding temperatures. According to the invention, fiber movement that a viscous resin system would otherwise cause is prevented, such that the desired fiber orientation and distribution are maintained within the blade preform throughout the molding operation.

While our invention has been described in terms of a preferred embodiment, it is apparent that other forms could be adopted by one skilled in the art. Accordingly, the scope of our invention is to be limited only by the following claims.

The embodiments of the invention in which an exclusive property or privilege is claimed are defined as follows:

1. A method for compression molding a fiber-reinforced composite fan blade while preventing fiber movement and resin loss during molding of the fan blade, the method comprising the steps of:

forming a resin-impregnated fiber-reinforced blade preform having a blade tip region and an oppositely disposed blade root region, the blade root region including a root face, a suction face and an oppositely disposed pressure face, and a forward face and an oppositely-disposed aft face;

selectively masking a limited exterior portion of the blade preform with a plurality of separate strips of a resin-impermeable material while leaving other exterior portions of the blade preform unmasked, the limited exterior portion comprising at least portions of the root face, the forward face, the aft face, the suction face, the pressure face, and edges of the blade root region between the root face, the forward face, the aft face, the suction face and the pressure face;

compression molding the blade preform to form the fiber-reinforced composite fan blade, the plurality of separate strips of said resin-impermeable material restraining flow of resin within the preform during the compression molding step such that the resin remains within the blade preform and such that fiber movement throughout the blade preform during the compression molding step is prevented; and stripping the plurality of separate strips of said resin-impermeable material from the fiber-reinforced composite fan blade.

2. The method as recited in claim 1 wherein the resin within the preform has a viscosity of at least twenty poise at about 180° C.

3. The method as recited in claim 1 wherein the modified epoxy-base resin is modified with a toughening agent.

4. The method as recited in claim 1 wherein the blade root region includes a root portion of the fiber-reinforced fan blade and a portion of the fiber-reinforced fan blade adjacent to the root portion.

5. The method as recited in claim 1 wherein the aft face has a longer longitudinal length than the forward face.

6. The method as recited in claim 1 wherein the masking step includes applying at least one layer of the plurality of separate strips of said resin-impermeable material on the root face.

7. The method as recited in claim 1 wherein the masking step includes applying at least one layer of the plurality of separate strips of said resin-impermeable material on the suction face and the pressure face.

8. The method as recited in claim 1 wherein the masking step includes applying at least one layer of the plurality of separate strips of said resin-impermeable material on the aft face.

9. The method as recited in claim 1 wherein the masking step includes applying at least two layers of the plurality of separate strips of said resin-impermeable material on the forward face.

10. The method as recited in claim 1 wherein the masking step includes applying at least three layers of the plurality of separate strips of said resin-impermeable material on the edge between the root face and the suction face, and on the edge between the root face and the pressure face.

11. The method as recited in claim 1 wherein the masking step includes applying at least four layers of the plurality of separate strips of said resin-impermeable material on the edge between the forward face and the pressure face, and at least three layers of the plurality of separate strips of said resin-impermeable material on the edge between the forward face and the suction face.

12. The method as recited in claim 1 wherein the masking step includes applying at least two layers of the plurality of separate strips of said resin-impermeable material on the edge between the aft face and the pressure face, and at least three layers of the plurality of separate strips of said resin-impermeable material on the edge between the aft face and the suction face.

13. A method for compression molding a fiber-reinforced composite fan blade while preventing fiber movement and resin loss during molding of the fan blade, the method comprising the steps of:

forming a fiber-reinforced blade preform impregnated with a modified epoxy-base resin having a viscosity of at least twenty poise at about 180° C., the blade preform having a blade tip region and an oppositely disposed blade root region, the blade root region including a root face, a suction face and an oppositely disposed pressure face, and a forward face and an oppositely-disposed aft face;

selectively masking with a resin-impermeable tape the root face, all of the forward face and all of the aft face, at least portions of both the suction face and the pressure face, and all edges of the blade root region between the root face, the forward face, the aft face, the suction face and the pressure face, wherein said step of masking comprises: applying at least two overlapping segments of the resin impermeable tape to the root face, applying at least one layer of the resin-impermeable tape to the suction face and the pressure face, applying at least two overlapping segments of the resin-impermeable tape to the aft face, and applying at least two layers of overlapping segments of the resin-impermeable tape to the forward face;

compression molding the blade preform so as to cure the modified epoxy-base resin and form the fiber-reinforced composite fan blade, the resin-impermeable tape preventing flow of the modified epoxy-base resin within the preform during the compression molding step such that the modified epoxy-base resin remains within the blade preform and such that fiber movement throughout the blade preform during the compression molding step is prevented; and stripping the resin-impermeable tape from the fiber-reinforced composite fan blade.

14. The method as recited in claim 13 wherein the modified epoxy-base resin within the preform has a viscosity of at least thirty poise at about 180° C.

15. The method as recited in claim 13 wherein the modified epoxy-base resin comprises the epoxy resin and a toughening agent, the toughening agent being one or more materials selected from the group consisting of thermoplastics and rubbers.

16. The method as recited in claim 15 wherein the modified epoxy-base resin comprises about thirty weight percent of the epoxy resin and about five weight percent of the toughening agent.

17. The method as recited in claim 13 wherein the masking step includes applying at least three layers of the resin-impermeable tape on the edge between the root face and the suction face, and at least three layers of the resin-impermeable tape on the edge between the root face and the pressure face.

18. The method as recited in claim 13 wherein the masking step includes applying at least four layers of the resin-impermeable tape on the edge between the forward face and the pressure face, and at least three layers of the resin-impermeable tape on the edge between the forward face and the suction face.

19. The method as recited in claim 13 wherein the masking step includes applying at least two layers of the resin-impermeable tape on the edge between the aft face and the pressure face, and at least three layers of the resin-impermeable tape on the edge between the aft face and the suction face.

20. A method for compression molding a fiber-reinforced composite fan blade while preventing fiber movement and resin loss during molding of the fan blade, the method comprising the steps of:

forming a fiber-reinforced blade preform impregnated with a modified epoxy-base resin having a viscosity of at least twenty poise at about 180° C. and comprising the epoxy resin and one or more toughening agents selected from the group consisting of thermoplastics and rubbers; the blade preform having a blade tip region and an oppositely disposed blade root region, the blade root region including a root face, a suction face, an oppositely disposed pressure face, a forward face, and an oppositely-disposed aft face;

selectively masking a limited exterior portion of only the blade root region with a plurality of separate strips of a resin-impermeable tape, the limited exterior portion comprising the root face, all of the forward face and all of the aft face, at least portions of both the suction face and the pressure face, and all edges of the blade root region between the root face, the forward face, the aft face, the suction face and the pressure face;

compression molding the blade preform to cure the modified epoxy-base resin and form the fiber-reinforced composite fan blade, the plurality of separate strips of said resin-impermeable tape preventing flow of the modified epoxy-base resin within the preform during the compression molding step such that the modified epoxy-base resin remains within the blade preform and such that fiber movement throughout the blade preform during the compression molding step is prevented; and stripping the plurality of separate strips of said resin-impermeable tape from the fiber-reinforced composite fan blade.

* * * * *